Dec. 18, 1956 M. BRENZO 2,774,166
AUTOMATIC FISHHOOK JERKING DEVICE
Filed May 9, 1956
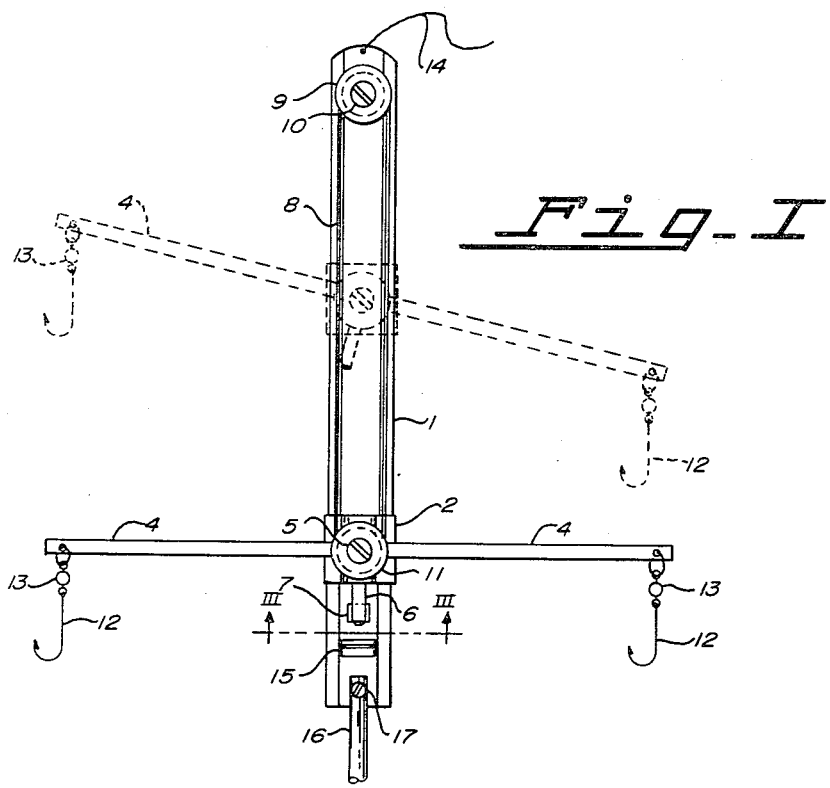
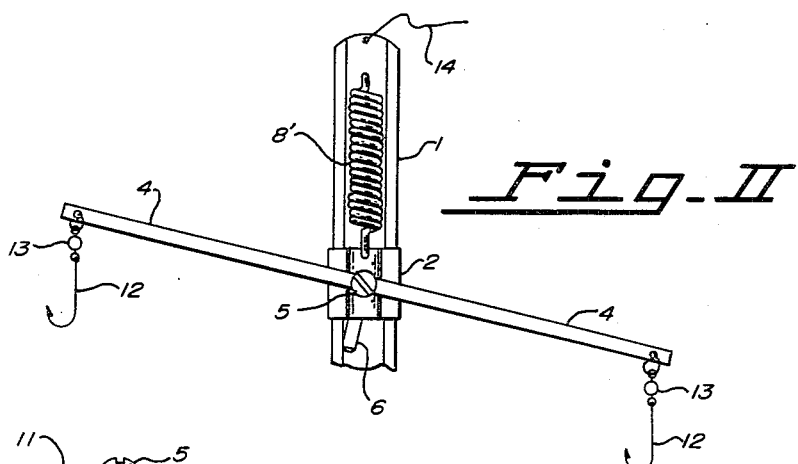
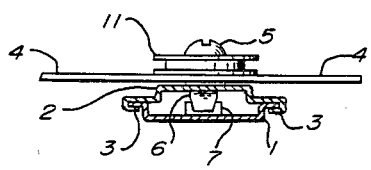
INVENTOR.
MYRON BRENZO
BY
Marshall, Marshall & Yeasting
ATTORNEYS

United States Patent Office 2,774,166
Patented Dec. 18, 1956

2,774,166
AUTOMATIC FISHHOOK JERKING DEVICE

Myron Brenzo, Port Clinton, Ohio

Application May 9, 1956, Serial No. 583,719

4 Claims. (Cl. 43—15)

This invention relates to fishing tackle and particularly to devices for automatically jerking fish hooks that have been disturbed by fish.

A skillful fisherman upon sensing through the disturbance of the fishing line that a fish has taken a hook imbedded in a bait or attached to a lure will promptly jerk the hook in a manner that experience has shown will set the barb of the hook in the fish's mouth without tearing the hook away. The fish thus trapped can be reeled in or pulled in with less liability that by thrashing about it may free itself from the hook.

Where a hook is at the far end of a long line, especially under windy conditions or where the water is agitated or in motion, it requires experienced finesse to properly set a hook in a fish's mouth. If the sportsman is a novice or becomes excited or is inattentive he may jerk too hard or too late or may otherwise fail to set the hook properly.

It is an object of this invention to provide a device closely attached to a fish hook which when a fish tugs either forcibly or gently upon the hook will instantly jerk the hook with the proper force and through the proper distance to set the hook in the fish's mouth without liability of so tearing the tissues as to impare the certainty with which the hook will hold.

A further object is to provide a fish hook jerking device of the above mentioned type which is capable of functioning with a plurality of fish hooks.

Another object is to provide a fish hook jerking device of the above mentioned type which may hang at the end of a line, or may be drawn through the water in trolling, or may stand at a predetermined distance above the bottom of a stream, lake or other body of water.

Other objects and numerous advantages of the invention will be apparent upon perusal of the following specification illustrated by the accompanying drawings, in which:

Fig. 1 is a front elevational view of a device embodying my invention, the device being shown as equipped with a rubber band being shown in cocked condition in full lines and in sprung condition in dash lines;

Fig. II is a front elevational view with the lower portion broken away, the device being shown as equipped with a coil spring and in sprung position; and Fig. III is a fragmentary sectional view taken as indicated by the line III—III of Fig. I.

The device in the form herein described comprises a track 1 preferably of channel form in cross section, upon which is slidably mounted a carriage 2 having flanges 3 along its opposite sides which embrace the edges of the track 1.

Mounted upon the carriage 2 is a pair of laterally extending arms 4 which pivot about a pintle 5 projecting forwardly from the carriage 2. The arms 4 are rigidly connected together and also are rigidly connected to a latch 6 so that whenever one or the other of the arms 4 is pulled downwardly or upwardly the latch 6 is moved sidewise.

Projecting forwardly from the back of the channel which constitutes the track 1 is a nib 7. The space within the channel on each side of the nib 7 is wide enough to permit the latch 6 to slide past the nib when it is swung to either side.

Extending from the carriage 2 to a point near the upper end of the track 1 is a resilient retractable member which may be a coil spring, such as is shown in Fig. II designated by the numeral 8', or a strip of rubber such as is shown in Fig. I designated by the numeral 8. Where a rubber band is employed it may extend between a flanged pulley or button 9 attached by means of a screw 10 to the channel near its upper end and a flanged pulley or button 11 which may be rotated on the screw 5 and thereby attached to a carriage 2. Fish hooks 12 are attached in any suitable manner, as by linkages 13 to the ends of the laterally extending arms 4 and a fishing line 14 may be attached in any suitable manner so as to take off from the track 1 near the upper end of the track 1.

To cock the device the carriage is pulled downwardly against the tension of the elastic member 8 one of the arms 4 being tilted downwardly to swing the latch 6 to one side and thus permit it to pass the nib 7 whereupon the arm 4 is returned to horizontal position to hook the latch 6 under the nib 7. In order to prevent the carriage from being pulled down too far, a lug 15 is fixed in the channel shaped track so that it will be encountered by the latch 6 soon after the latch passes the nib 7.

The device as so far described is capable of use in trolling. It is preferably made of rust proof material such as anodized aluminum or stainless steel. Its buoyancy and the position that it assumes in trolling at various speeds may be adjusted if desired by affixing floats or sinkers or while hanging from a line and thus held somewhat above the bottom of the body of water in which it is being used. In order however to insure that the fish hooks 12 be kept at a preferred distance from the bottom when the device is being used in still fishing, it is equipped with a detachable stem 16, the lower end of which may either rest upon the bottom or under some circumstances may penetrate the bottom and thus function to hold the device upright even when the fishing line 14 is slack. The stem 16 which preferably is slotted at its upper end and is secured to the track 1 by means of a set screw 17, may be extensible or the device may be equipped with a series of stems of various lengths.

Operation

With the device cocked in the manner in which it is shown in Fig. I and suspended or standing in the water to be fished, a fish tugging either gently or vigorously upon one of the hooks 12 will tilt the arms 4 and thus move the latch 6 from beneath the nib 7 whereupon the carriage 2 and the parts carried thereby including both hooks 12 will be jerked upwardly thus setting the barbed portion of the fish hook in the fish's mouth. The force with which the hooks are jerked can be varied by employing the shorter and/or thicker or longer and/or thinner rubber band 8, or springs of different lengths and/or strengths.

The foregoing device as illustrated by the accompanying drawings is exemplary only and the invention is susceptible to variations and modifications within the spirit and scope of the subjoined claims.

I claim:

1. A device for automatically jerking fish hooks comprising, in combination, a track of channel shape form in cross section, said track being adapted to have a fishing line attached thereto, a carriage slidably mounted upon said track, an arm extending laterally from said carriage, a latch fixed to said arm and extending downwardly, a nib fixed to said track and projecting forwardly from the back of said channel, therebeing sufficient space on each side of said nib for said latch to move upwardly or downwardly past said nib when said latch is swung to one side of said nib, a lug fixed to said track in position to limit the movement of said carriage therealong, a resilient retractable member consisting of a strip of elastic material, means for attaching said resilient retractable member to said track adjacent its upper end and to said carriage, whereby said resilient retractable member is elastically deformed when said catch is engaged with said nib, and means for connecting a fish hook to said arm, whereby a tug upon said fish hook will release said catch from said nib and said fish hook will be jerked.

2. A device for automatically jerking fish hooks comprising, in combination, a track of channel shape form in cross section, said track being adapted to have a fishing line attached thereto, a carriage slidably mounted upon said track, an arm extending laterally from each side of said carriage, a latch fixed to said arm and extending downwardly of said track, a nib fixed to said track and projecting forwardly from the back of said channel, therebeing sufficient space on each side of said nib for said latch to move upwardly or downwardly past said nib when said latch is swung to one side of said nib, a lug fixed to said track in position to limit the movement of said carriage therealong, a resilient retractable member consisting of a strip of elastic material, means for attaching said resilient retractable member to said track adjacent its upper end and to said carriage, whereby said resilient retractable member is elastically deformed when said catch is engaged with said nib, means for connecting a fish hook to each said arm, whereby a tug upon either of said fish hooks will release said catch from said nib and said fish hook will be jerked, and a stem detachably fastened to the lower end of said track and adapted to hold said fish hooks at a desired distance above the bottom of a body of water with which the lower end of said stem is engaged.

3. A device for automatically jerking fish hooks comprising, in combination, a track, said track being adapted to have a fishing line attached thereto, a carriage slidably mounted upon said track, an arm extending laterally from each side of said carriage, a latch fixed to said arm and extending said track, a nib fixed to said track, therebeing sufficient space on each side of said nib for said latch to move upwardly or downwardly past said nib when said latch is swung to one side of said nib, a lug fixed to said track in position to limit the movement of said carriage therealong, a resilient retractable member consisting of a strip of elastic material, means for attaching said resilient retractable member to said track adjacent its upper end and to said carriage, whereby said resilient retractable member is elastically deformed when said catch is engaged with said nib, means for connecting a fish hook to each said arm, whereby a tug upon either of said fish hooks will release said catch from said nib and said fish hook will be jerked, and a stem detachably fastened to the lower end of said track and adapted to hold said fish hooks at a desired distance above the bottom of a body of water with which the lower end of said stem is engaged.

4. A device for automatically jerking fish hooks comprising, in combination, a track of channel shape form in cross section, said track being adapted to have a fishing line attached thereto, a carriage slidably mounted upon said track, an arm extending laterally from said carriage, a latch fixed to said arm and extending downwardly, a nib fixed to said track and projecting forwardly from the back of said channel, therebeing sufficient space on each side of said nib for said nib for said latch to move upwardly or downwardly past said nib when said latch is swung to one side of said nib, a resilient member, means for attaching said resilient member to said track end and to said carriage, whereby said resilient member is elastically deformed when said catch is engaged with said nib, and means for connecting a fish hook to said arm, whereby a tug upon said fish hook will release said catch from said nib and said fish hook will be jerked.

References Cited in the file of this patent
UNITED STATES PATENTS

| 263,638 | Wentworth | Aug. 29, 1882 |
| 1,767,723 | Vasilevsky | June 24, 1930 |
| 2,589,715 | Lysikowski | Mar. 18, 1952 |